United States Patent [19]

Rekers et al.

[11] 4,049,896

[45] Sept. 20, 1977

[54] OLEFIN POLYMERIZATION CATALYST

[75] Inventors: Louis J. Rekers, Wyoming; Stanley J. Katzen; Jerome H. Krekeler, both of Cincinnati, all of Ohio

[73] Assignee: National Petro Chemicals Corporation, New York, N.Y.

[21] Appl. No.: 716,038

[22] Filed: Aug. 20, 1976

Related U.S. Application Data

[62] Division of Ser. No. 558,504, March 14, 1975, Pat. No. 3,984,351.

[51] Int. Cl.$^2$ .................... C08F 4/78; C08F 10/00
[52] U.S. Cl. .................... 526/129; 526/105; 526/106; 526/130; 526/132; 526/134; 526/151; 526/154; 526/156; 526/352; 526/905
[58] Field of Search ............... 526/105, 106, 129, 130, 526/132, 134, 151, 154, 156

[56] References Cited

U.S. PATENT DOCUMENTS

| | | | |
|---|---|---|---|
| 3,392,160 | 7/1968 | Orzechowski | 526/134 |
| 3,642,749 | 2/1972 | Johnson et al. | 526/129 |
| 3,704,287 | 11/1972 | Johnson | 526/129 |
| 3,806,500 | 4/1974 | Karol | 526/129 |
| 3,875,132 | 4/1975 | Kruse | 526/129 |
| 3,984,351 | 10/1976 | Rekers et al. | 526/132 |
| 3,985,676 | 10/1976 | Rekers et al. | 252/430 |

*Primary Examiner*—Alan Holler
*Attorney, Agent, or Firm*—Kenneth D. Tremain

[57] ABSTRACT

Olefin polymerization catalysts are prepared by depositing a chromium compound and an aluminum compound on an inorganic support material and heating the support material in a non-reducing atmosphere at a temperature above about 300° C up to the decomposition temperature of the support material. The supported chromium and aluminum compound is then combined with a metallic and/or non-metallic reducing agent, to provide a catalyst system useful in the polymerization of 1-olefins.

3 Claims, No Drawings

OLEFIN POLYMERIZATION CATALYST

This is a division of application Ser. No. 558,504, filed Mar. 14, 1975, now U.S. Pat. No. 3,984,351.

BACKGROUND OF THE INVENTION

The use of chromium compounds in the polymerization of olefins is well known. U.S. Pat. Nos. 2,825,721 and 2,951,816 teach the use of $CrO_3$ supported on an inorganic material such as silica, alumina or combinations of silica and alumina and activated by heating at elevated temperatures to polymerize olefins. When these catalyst systems are used in various polymerization processes such as the well-known particle-form process, the resins produced, while useful in many applications, are unsatisfactory for others because of a deficiency in certain properties such as melt index.

Attempts to improve deficient properties of polyolefins produced using supported, heat-activated chromium oxide catalysts have been made by adding various metal and non-metal compounds to the supported chromium oxide prior to activation by heating. For example, in U.S. Pat. No. 3,622,522 it is suggested that an alkoxide of gallium or tin be added to supported chromium oxide prior to heat activation. U.S. Pat. No. 3,715,321 suggests adding a compound of a Group II-A or Group III-B metal to supported chromium oxide prior to heat treatment whereas U.S. Pat. No. 3,780,011 discloses adding alkyl esters of titanium, vanadium or boron and U.S. Pat. No, 3,484,428 discloses adding alkyl boron compounds.

In columns 5 and 6 and Table I of U.S. Pat. No. 3,622,522 the addition of aluminum isopropoxide to supported chromium oxide prior to heat activation is shown for purposes of comparison with the addition of an alkoxide of gallium or tin. The patentee concluded that the addition of the aluminum compound gave substantially the same or an increased HLMI/MI ratio of polymers produced as compared to the chromium oxide catalyst with no metal alkoxide added, whereas the addition of gallium or tin alkoxides produced polymers having a lower HLMI/MI ratio.

None of the above-mentioned patents disclose using the heat-activated supported catalyst with a metal or non-metal reducing agent.

It is also known to utilize other chromium compounds as catalysts for the polymerization of olefins. Such compounds include various silyl chromate and polyalicyclic chromate esters as described, for example, in U.S. Pat. Nos. 3,324,095; 3,324,101; 3,642,749; and 3,704,287. The use of phosphorus-containing chromate esters in olefin polymerization catalysts have also been disclosed in the aforesaid U.S. Pat. No. 3,704,287; and in U.S. Pat. No. 3,474,080 and copending application Ser. No. 532,131, filed Dec. 16, 1974, now U.S. Pat. No. 3,985,676.

Use of the above chromium compound catalysts in Ziegler-type coordination catalyst systems has also been proposed. As is well known in the art, such catalysts frequently additionally comprise organometallic reducing agents such as, for example, trialkyl aluminum compounds. Ziegler-type catalyst systems incorporating supported chromium compound catalyst and organometallic reducing agents, particularly organoaluminum compounds, are disclosed, for example, in U.S. Pat. Nos. 3,324,101; 3,642,749; 3,704,287; 3,806,500; and in the aforesaid copending application Ser. No. 532,131.

SUMMARY OF THE INVENTION

It has been discovered in accordance herewith that the properties of olefin polymers, e.g. melt indexes, may be substantially improved by utilization of an olefin polymerization catalyst system prepared by depositing a chromium containing compound and an aluminum compound on an inorganic support material and heating the supported chromium containing compound and aluminum compound at a temperature above 300° C up to the decomposition temperature of the support. The heat treated, supported chromium containing compound and aluminum compound is then combined with a metallic and/or non-metallic reducing agent, in particular boron compounds, to provide the novel catalyst systems of the present invention. Polymers produced using the novel catalyst systems of the present invention have improved flow properties and shear response.

DETAILED DESCRIPTION OF THE INVENTION

The novel catalyst systems of the present invention are prepared by depositing, on an inorganic support material having surface hydroxyl groups, an aluminum compound capable of reacting with the surface hydroxyl groups of the support material and a chromium containing compound capable of reacting with the surface hydroxyl groups of the support material. The supported chromium and aluminum compounds are then heated in a non-reducing atmosphere at a temperature above about 300° C up to the decomposition temperature of the support material. The heat treated, support chromium and aluminum compounds are then combined with a metal and/or non-metal reducing agent, preferably a boron containing compound to provide the novel catalyst systems of the present invention.

It is believed that the chromium containing compounds and the aluminum compounds may react with the surface hydroxyl groups on the inorganic support material during the course of preparing the novel catalyst systems of the present invention. However, the precise mechanism involved is not known and applicants do not wish to be restricted to the mechanism postulated above.

The inorganic support materials useful in the present invention include those normally employed in supported chromium catalysts used in olefin polymerizations such as those discussed in U.S. Pat. No. 2,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. No. 3,652,214 which silica xerogels have a surface area in the range of 200 to 500 m²/g, a pore volume greater than about 2.0 cc/g, a major portion of the pore volume being provided by pores having diameters in the range of 300 to 600 A.

The chromium containing compounds useful in the present invention comprise any chromium containing compound capable of reacting with the surface hydroxyl groups of an inorganic support. Examples of such compounds include chromium trioxide, chromate esters such as those disclosed in U.S. Pat. No. 3,642,749; and 3,704,287, and organophosphoryl chromium compounds such as those disclosed in applicants copending application Ser. No. 532,131, filed Dec. 16, 1974 which comprise the reaction product of chromium trioxide with an organophosphorus compound having the formula:

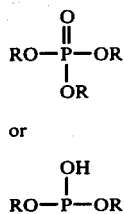

or

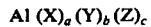

wherein R is alkyl, aralkyl, aryl, cycloalkyl or hydrogen, but at least one R is other than hydrogen. The preferred organophosphorus compounds are trialkyl phosphates such as triethyl phosphate.

Aluminum compounds useful in the present invention are characterized as any aluminum compound capable of reacting with the surface hydroxyl groups of the inorganic support material. Preferred aluminum compounds may be represented by the formula:

$$Al\ (X)_a(Y)_b(Z)_c$$

wherein X is R, Y is OR, and Z is H or a halogen; a is 0-3, b is 0-3, c is 0-3, and $a + b + c$ equals 3; and R is an alkyl or aryl group having from one to eight carbon atoms.

Examples of such aluminum compounds include aluminum alkoxides such as aluminum sec-butoxide, aluminum ethoxide, aluminum isopropoxide; alkyl aluminum alkoxides such as ethyl aluminum ethoxide, methyl aluminum propoxide, diethyl aluminum ethoxide, diisobutyl aluminum ethoxide, etc.; alkyl aluminum compounds such as triethyl aluminum; triisobutyl aluminum, etc.; alkyl or aryl aluminum halides such as diethyl aluminum chloride; aryl aluminum compounds such as triphenyl aluminum, aryloxy aluminum compounds such as aluminum phenoxide and mixed aryl, alkyl and aryloxy, alkyl aluminum compounds.

The novel catalysts of the present invention may be prepared by depositing the chromium containing compound and the aluminum compound on the inorganic support in any suitable manner such as by vapor coating or by impregnating the support with solutions of the chromium containing compound and the aluminum compound in a suitable inert solvent which is normally an anhydrous organic solvent. Such organic solvents include aliphatic, cycloalkyl and alkylaryl hydrocarbons and their halogenated derivatives. A preferred organic solvent is dichloromethane. The chromium containing compound may be applied to the support first or the aluminum compound may be applied first or the chromium and aluminum compound may be applied together. In applicants' usual method of catalyst preparation, the support is impregnated first with the chromium containing compound and then the aluminum compound.

When an organophosphoryl chromium compound of the type disclosed in the aforesaid copending application Ser. No. 532,131 is utilized in the practice of the present invention, it is preferred to employ the particular catalyst preparation techniques described in that application, the disclosure of which is incorporated by reference herein. In such instance the organoaluminum compound may be applied to the catalyst support under conditions similar to those utilized for deposition of the organophosphoryl chromium compound.

The most effective catalysts have been found to be those containing the chromium compound in an amount such that the amount of Cr by weight based on the weight of the support is from about 0.25 to 2.5% and preferably is from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5% although other amounts outside of these ranges can be used to prepare operable catalysts.

After the chromium containing compound and the aluminum compound have been deposited on the inorganic support, the support is heated in a non-reducing atmosphere, preferably in an oxygen containing atmosphere, at a temperature above about 300° C up to the decomposition temperature of the support. Typically, the supported compositions are heated at a temperature of from 500° to 1000° C. The heating time may vary, for example, depending on the temperature used, from ½ hour or less to 50 hours or more. Normally the heating is carried out over a period of 2 to 12 hours. The non-reducing atmosphere which is preferably air or other oxygen containing gas should be dry and preferably should be dehumidified down to a few parts per million (ppm) of water to obtain maximum catalyst activity. Typically, air used in the procedure described in this application is dried to less than 2-3 ppm of water.

The heat-treated supported chromium and aluminum compounds of the present invention are used in combination with metallic and/or non-metallic reducing agents to provide novel catalysts systems for the polymerization of olefins. Examples of metallic reducing agents include trialkyl aluminums, such as triethyl aluminum, triisobutyl aluminum, alkyl aluminum halides, alkyl aluminum alkoxides, dialkyl zinc, dialkyl magnesium, and metal borohydrides including those of the alkali metals, especially sodium, lithium and potassium, and of magnesium, beryllium and aluminum. The non-metal reducing agents include boron alkyls such as triethyl borane, triisobutyl borane, and trimethyl borane and hydrides of boron such as diborane, pentaborane, hexaborane and decaborane.

The heat-treated, supported chromium containing compound and aluminum compound may be combined with the metallic or non-metallic reducing agent prior to being fed to an olefin polymerization reactor or these two components may be fed separately to an olefin polymerization reactor.

In proportioning the amount of metallic or non-metallic reducing agent to the amount of chromium compound used in the catalyst systems of the present invention, fairly wide latitude is available, but some guidelines have been established consistent with good yield, favorable polymer properties and economic use of materials. For example, in the use of metallic and/or non-metallic reducing agents with an amount of chromium compound sufficient to yield about 1% Cr by weight of the support the parameters set forth below are representative. The atomic ratios are based upon a calculation of the metal in the metallic reducing agent and/or the non-metal in the non-metallic reducing agent versus the chromium content present in the chromium compound on the support.

Foe example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to about 8/1, or from about 1.9% to about 30% by weight TIBAL. The overall practicable limits of TIBAL in terms of the Al/Cr atomic ratio are from about 0.1/1 to 20/1, and in terms of weight are from about 0.4% to about 75% by weight.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl boron (TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1/1 to 10/1, or from about 0.19 to about 19% TEB. The overall practicable limits, in terms of a B/Cr ratio, are from about 0.01/1 to about 20/1, and in terms of weight, are from about 0.02% to about 38% by weight based upon the weight of the support.

As indicated above, the catalyst compositions of this invention are amenable to use with conventional polymerization processes for olefins, in particular 1-olefins having 2-8 carbon atoms and are suitable for polymerization effected under temperature and pressure conditions generally employed in the art, e.g., temperatures of from about 40° C to about 200° C and preferably from about 7° C to 110° C, and pressures of from 200 to 1000 psig and preferably from 300 to 800 psig, as are used in slurry or particle form polymerizations.

A series of olefin polymerizations, the results of which are reported in Tables I to VI below, were carried out to demonstrate the ability of the novel catalyst systems of the present invention to produce polymers having enhanced physical properties such as increased melt indexes. The polymerizations were carried out in a stirred autoclave using isobutane as a diluent. The supported chromium compound and aluminum compound where used and the reducing agent where used is added along with the isobutane solvent to a stirred one gallon autoclave. The contents of the stirred autoclave are then heated to the polymerization temperature, i.e., 88° to 108° C. Hydrogen, if used, is added and then the ethylene is added to give 10 mol % in the liquid phase at which time the total pressure will be from about 425 to 455 psig. polymerization begins almost immediately as noted by the ethylene coming from the ethylene demand supply system to the reactor. After approximately one hour of polymerization, the reaction is terminated by dropping the reactor contents into a pressure let-down system. The melt index (M.I.) and the high load melt index (HIMI) of the polymers prepared were determined using ASTM D-1238-65-T (conditions E and F respectively).

The catalysts used in the polymerizations runs on Tables I-VI below were prepared in accordance with the following Catalyst Preparation Procedure.

CATALYST PREPARATION PROCEDURE

A. Microspheroidal silica gel having a pore volume of about 2.5 cc/g prepared in accordance with the disclosusure in U.S. Pat. No. 3,652,215 is added to a 2000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of a gel. A dichloromethane solution of the reaction product of $CrO_3$ and triethyl phosphate prepared as described in copending application Ser. No. 532,131, filed Dec. 16, 1974 is then added to the flask in sufficient quantity to provide a dry coated catalyst containing about 1% by weight of Cr. The supernatant liquid is removed by filtration and the coated gel is dried in a rotary evaporator at 6° C and with 29 inches of Hg vacuum. B/ Dichloromethane is added to a similar flask as used in step A and while maintaining a nitrogen atmosphere stirring is commenced. To the flask is added the supported chromium composition prepared in step A above. A solution of dichloromethane and aluminum sec-butoxide is prepared in a pressure equalizing dropping funnel and the funnel attached to the stirred flask. The aluminum sec-butoxide solution is gradually added to the flask at the rate of 10 grams of solution per minute. After the addition of the solution is complete the slurry in the flask is stirred for about 1 hour. The supernatant liquid is removed by filtration and the coated gel is dried in a rotary evaporator at temperatures up to about 60° C and 29 inches Hg vacuum. The amount of aluminum compound added depends on the % aluminum desired for the production of olefin polymers having specific properties necessary for certain end use applications.

C. To heat activate the catalyst composition prepared in step B, the supported catalyst is placed in a cylindrical container and fluidized with dry air at 0.20 feet per minute lineal velocity while being heated to a temperature of 900° C and held at this temperature for six hours. The activated supported catalyst is recovered as a powder.

In Table I a series of polymerizations were carried out to illustrate the results from using increased amounts of the aluminum compound in the preparation of the catalyst. The catalyst were prepared as in the Catalyst Preparation Procedure above. Except as noted, polymerizations were carried out at 93.5° C and hydrogen (30 psi) and triethyl borane (2.7 B/Cr atomic ratio) were added to the polymerization reactor.

TABLE I

| Al % wt./SiO$_2$[1] | Productivity (gms Polymer/gm cat./hr.) | MI | HLMI |
|---|---|---|---|
| None | 558 | low | 7.0 |
| .1 | 1328 | 0.04 | 9.1 |
| .2 | 717 | 0.05 | 11.4 |
| 1.0 | 780 | 0.36 | 67.5 |
| 2.4 | 926 | 1.10 | 116.5 |
| 3.7 | 886 | 2.68 | 340 |

TABLE I-continued

| Al % wt./SiO$_2$[1] | Productivity (gms Polymer/gm cat./hr.) | MI | HLMI |
|---|---|---|---|
| 5.5[2] | 616 | 4.90 | 390 |

[1]gms Al per 100 gms SiO$_2$ support
[2]Polymerization temperature 99° C B/Cr atomic ratio 2.9

In Table II below a series of polymerizations were carried out to demonstrate the dramatic response of the catalyst systems of the present invention to increasing hydrogen concentrations. The catalysts were prepared in accordance with the Catalyst Preparation Procedure above. For comparison purposes polymerizations using a catalyst prepared without the aluminum compound of step B were included. The polymerizations were carried out at about 99° C and triethyl borane (2.9 B/Cr atomic ratio) was added to the polymerization reactor.

TABLE II

| Hydrogen (psi) | Al % Wt./SiO$_2$ | Productivity (gm PE/gm cat./hr.) | MI | HLMI |
|---|---|---|---|---|
| None | 3.7 | 1198 | 1.5 | 127.2 |
| None | None | 1158 | 0.07 | 9.0 |
| 30 | 3.7 | 1032 | 5.52 | 419 |
| 30 | None | 1194 | 0.12 | 14.5 |
| 75 | 3.7 | 910 | 18 | High |
| 75 | None | 684 | 0.37 | 32.0 |
| 120 | 3.7 | 613 | 22.6 | High |
| 120 | None | 482 | 0.69 | 52.4 |

In Table III below a series of polymerizations were carried out to demonstrate the improved hydrogen response of the catalyst systems of the present invention as indicated by the increase in melt index compared to catalyst without the aluminum and/or triethyl borane (TEB) present. The catalysts were prepared as in the Catalyst Preparation Procedure above, except that the aluminum compound of step B was omitted where indicated. The polymerizations were carried out at about 99° C and hydrogen was added to the reactor at a pressure of 120 psi except as otherwise indicated.

TABLE III

| B/Cr (Atomic Ratio) | Al % Wt./SiO$_2$ | H$_2$ (psi) | Productivity (gm PE/gm cat./hr.) | MI | HLMI |
|---|---|---|---|---|---|
| 0 | None | 0 | 622 | 0.26 | 27.8 |
| 2.9 | None | 0 | 1158 | 0.07 | 9.0 |
| 0 | 3.7 | 0 | 1032 | 0.71 | 53.6 |
| 2.9 | 3.7 | 0 | 1048 | 1.70 | 118.8 |
| 0 | None | 30 | 190 | 0.58 | 43.9 |
| 0 | 3.7 | 30 | 1399 | 0.75 | 58.2 |
| 1.45 | None | 120 | 636 | 0.24 | 26.0 |
| 1.45 | 3.7 | 120 | 736 | 10.0 | High |
| 2.9 | None | 120 | 482 | 0.69 | 52.4 |
| 2.9 | 3.7 | 120 | 613 | 22.6 | High |
| 5.8 | None | 120 | 483 | 0.50 | 49.5 |
| 5.8 | 3.7 | 120 | 422 | 40.3 | High |

In Table IV below polymerizations were carried out to illustrate the effect of increasing polymerization reaction temperature on the metal index of polymers produced using the novel catalyst systems of the present invention. The catalysts were prepared in accordance with the Catalyst Preparation Procedure above. For comparison purposes polymerizations using a catalyst prepared without the aluminum compound of step B were included. Hydrogen, at a pressure of 120 psi and triethyl borane (2.9 B/Cr atomic ratio) were added to the reactor.

TABLE IV

| Al % Wt./SiO$_2$ | Polymerization Temperature (° C) | Productivity (gm Polymer/gm cat./hr) | MI | HLMI |
|---|---|---|---|---|
| 3.7 | 88 | 561 | 1.75 | 183 |
| None |  | 544 | low | 5.2 |
| 3.7 | 93.5 | 784 | 6.2 | (1) |
| None |  | 879 | 0.10 | 12.4 |
| 3.7 | 99 | 613 | 22.6 | (1) |
| None |  | 482 | 0.69 | 52.4 |
| 3.7 | 101.5 | 437 | 189.0 | (1) |
| None |  | 434 | 0.58 | 59.8 |

(1) Too high to measure accurately

In Table V a series of polymerizations were carried out to illustrate the suitability of using aluminum compounds other than aluminum sec-butoxide in the catalyst systems of the present invention. The catalysts were prepared in accordance with the Catalyst Preparation Procedure above using the aluminum compound specified in the table in step B. The polymerizations were carried out at about 99° C and hydrogen at a pressure of 120 psi and triethyl borane (2.9 B/Cr atomic ratio) were added to the reactor.

TABLE V

| Al Compound | Al% Wt./SiO$_2$ | Productivity (gm Polymer/gm cat./hr.) | MI | HLMI |
|---|---|---|---|---|
| None | None | 482 | .69 | 52.4 |
| Aluminum Sec-butoxide | 3.7 | 613 | 22.6 | High |
| Diisobutyl Aluminum Ethoxide | 3.7 | 801 | 20.8 | 1052 |
| Diethyl Aluminum Ethoxide | 3.7 | 669 | 16.8 | 1093 |
| Aluminum Phenoxide | 3.7 | 540 | 4.3 | 417 |
| Triisobutyl Aluminum | 2.1 | 744 | 24.2 | 1980 |

In Table VI, polymerizations were carried out to demonstrate the use of other supports and other chromium compounds in the catalyst system of the present invention. In Runs 1 and 2 a catalyst was prepared in accordance with the Catalyst Preparation Procedure of step A using MS 952 silica gel, a product of W.R. Grace and Co., which has a pore volume of about 1.6 cc/g as the support material. In Runs 3 and 4 a similar catalyst using MS 952 silica gel was used with the aluminum compound of step B added. The catalysts used in Runs 1-4 were heat activated as in step C at a temperature of 840° C and instead of 900° C. In Runs 5 and 6 a catalyst prepared by depositing CrO$_3$ on a silica gel having a pore volume of about 2.5 cc/g and heat activating at a temperature of about 900° C for six hours was used. Runs 7 and 8 used the same CrO$_3$ catalyst as Runs 5 and 6 with the aluminum compound being added as in Step B of the Catalyst Preparation Procedure. The chromium content of the catalysts in Runs 5-8 is about 0.69%. The polymerization of Runs 1-8 were carried out at 99° C using triethyl borane (2.9 B/Cr atomic ratio) with or without hydrogen as indicated in Table VI.

TABLE VI

| Run No. | Al% Wt./SiO$_2$ | Productivity (gm Polymer/gm cat./hr.) | H$_2$ (psi) | MI | HLMI |
|---|---|---|---|---|---|
| 1 | None | 660 | None | 0.05 | 9.6 |
| 2 | None | 669 | 30 | .125 | 17.9 |
| 3 | 3.7 | 701 | None | 0.62 | 85.6 |
| 4 | 3.7 | 639 | 30 | 3.3 | 497 |
| 5 | None | 1097 | None | 0.15 | 18.1 |

TABLE VI-continued

| Run No. | Al% Wt./SiO$_2$ | Productivity (gm Polymer/gm cat./hr.) | H$_2$ (psi) | MI | HLMI |
|---|---|---|---|---|---|
| 6 | None | 832 | 30 | 0.86 | 62 |
| 7 | 3.7 | 704 | None | 19.6 | 1823 |
| 8 | 3.7 | 683 | 30 | 114.2 | High |

What is claimed is:

1. A process for the polymerization of olefins which comprises contacting said olefins with the catalyst system comprising:
   a. a solid inorganic support material having surface hydroxyl groups,
   b. a chromium containing compound deposited on said support, said chromium containing compound being capable of reacting with said surface hydroxyl groups, and
   c. an aluminum compound deposited on said support, said aluminum compound being capable of reacting with said surface hydroxyl groups,
   said supported chromium containing compound and aluminum compound having been heated in a non-reducing atmosphere at a temperature above 300° C. up to the decomposition temperature of the support material and combined with a metallic or non-metallic reducing agent.

2. The process of claim 1 wherein the non-metallic reducing agent is a trialkyl borane.

3. The process of claim 1 wherein the polymerization is carried out in the presence of hydrogen.

UNITED STATES PATENT AND TRADEMARK OFFICE
CERTIFICATE OF CORRECTION

PATENT NO. : 4,049,896
DATED : September 20, 1977
INVENTOR(S) : Louis J. Rekers et al.

It is certified that error appears in the above-identified patent and that said Letters Patent are hereby corrected as shown below:

Col. 5, line 48 "7°" should read as -- 70° --

Col. 6, line 27 "6°" should read as -- 60° --

Signed and Sealed this

Twenty-eighth Day of February 1978

[SEAL]

Attest:

RUTH C. MASON
Attesting Officer

LUTRELLE F. PARKER
Acting Commissioner of Patents and Trademarks